US010605119B2

(12) United States Patent
Ward (10) Patent No.: US 10,605,119 B2
(45) Date of Patent: Mar. 31, 2020

(54) TURBINE FRAME ASSEMBLY FOR GAS TURBINE ENGINES

(71) Applicant: Belcan, LLC

(72) Inventor: Eric J. Ward, West Palm Beach, FL (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 214 days.

(21) Appl. No.: 15/714,005

(22) Filed: Sep. 25, 2017

(65) Prior Publication Data

US 2019/0093507 A1 Mar. 28, 2019

(51) Int. Cl.
*F01D 25/16* (2006.01)
*F01D 9/06* (2006.01)
*F02C 7/20* (2006.01)

(52) U.S. Cl.
CPC ........... *F01D 25/162* (2013.01); *F01D 9/065* (2013.01); *F02C 7/20* (2013.01); *F05D 2250/232* (2013.01); *F05D 2260/37* (2013.01)

(58) Field of Classification Search
CPC ........... F01D 9/065; F01D 25/162; F02C 9/20
See application file for complete search history.

(56) References Cited

U.S. PATENT DOCUMENTS

| | | | |
|---|---|---|---|
| 2,919,888 A | 1/1960 | Simmons | |
| 2,941,848 A * | 6/1960 | Johnson | F01D 25/162 384/215 |
| 3,369,366 A * | 2/1968 | Howald | F02C 7/20 60/39.83 |
| 4,183,207 A * | 1/1980 | Libertini | F01D 9/065 184/6.11 |
| 4,972,671 A | 11/1990 | Asselin et al. | |
| 4,979,872 A | 12/1990 | Myers et al. | |
| 4,987,736 A * | 1/1991 | Ciokajlo | F01D 9/065 415/138 |
| 5,076,049 A * | 12/1991 | Von Benken | F01D 25/24 415/138 |
| 5,483,792 A | 1/1996 | Czachor | |
| 5,746,574 A * | 5/1998 | Czachor | F01D 5/189 285/368 |
| 7,278,516 B2 | 10/2007 | Zalewski et al. | |

(Continued)

FOREIGN PATENT DOCUMENTS

EP 1359364 11/2003
GB 695482 A * 8/1953 ............. F01D 9/065

(Continued)

OTHER PUBLICATIONS

European Search Report for European Patent Application No. 18196691.2 completed Feb. 15, 2019.

(Continued)

*Primary Examiner* — Moshe Wilensky
*Assistant Examiner* — Topaz L. Elliott
(74) *Attorney, Agent, or Firm* — Carlson, Gaskey & Olds, P.C.

(57) ABSTRACT

A turbine frame for a gas turbine engine according to an example of the present disclosure includes a turbine case, a bearing support housing that defines a receptacle, and a tie rod preloaded in compression between the turbine case and the bearing support housing.

20 Claims, 7 Drawing Sheets

(56) References Cited

U.S. PATENT DOCUMENTS

| | | | |
|---|---|---|---|
| 7,762,087 B2 | 7/2010 | Somanath et al. | |
| 8,001,791 B2 * | 8/2011 | Somanath | F01D 25/162 |
| | | | 415/138 |
| 8,061,969 B2 | 11/2011 | Durocher et al. | |
| 8,992,173 B2 | 3/2015 | Farah et al. | |
| 9,587,514 B2 * | 3/2017 | Farah | F01D 25/16 |
| 2010/0135786 A1 * | 6/2010 | Manteiga | F01D 9/065 |
| | | | 415/232 |
| 2010/0275572 A1 | 11/2010 | Durocher et al. | |
| 2013/0067930 A1 | 3/2013 | Paradis | |
| 2014/0013770 A1 * | 1/2014 | Farah | F01D 25/16 |
| | | | 60/796 |
| 2015/0345337 A1 | 12/2015 | Petty | |
| 2016/0153315 A1 | 6/2016 | Kapustka et al. | |
| 2016/0201516 A1 | 7/2016 | Bauer et al. | |
| 2016/0245105 A1 | 8/2016 | Farah et al. | |
| 2016/0333739 A1 | 11/2016 | Vo et al. | |
| 2017/0107856 A1 * | 4/2017 | Lefebvre | F01D 25/246 |
| 2018/0149085 A1 * | 5/2018 | Chennoju | F02C 7/18 |

FOREIGN PATENT DOCUMENTS

| | | |
|---|---|---|
| WO | 2014011983 | 1/2014 |
| WO | 2015026600 | 2/2015 |
| WO | 2017015745 | 2/2017 |

OTHER PUBLICATIONS

European Search Report for Application No. 16170483.8 dated Aug. 31, 2016.

* cited by examiner

TURBINE FRAME ASSEMBLY FOR GAS TURBINE ENGINES

STATEMENT REGARDING FEDERALLY SPONSORED RESEARCH OR DEVELOPMENT

This invention was made with government support under Contract No. W58RGZ-16-C-0046, awarded by the United States Army. The Government has certain rights in this invention.

BACKGROUND

This disclosure relates to a turbine frame assembly for a gas turbine engine, and more particularly to a turbine frame that supports a bearing.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. Some turbine engines include a turbine frame in the turbine section that transfers loads between a bearing and other portions of the engine static structure.

SUMMARY

A turbine frame for a gas turbine engine according to an example of the present disclosure includes a turbine case, a bearing support housing that defines a receptacle, and a tie rod preloaded in compression between the turbine case and the bearing support housing.

In a further embodiment of any of the foregoing embodiments, the tie rod includes a first end portion and a second end portion, and the bearing support housing defines a receptacle that at least partially receives the second end portion, with walls of the receptacle that have a complementary geometry with walls of the second end portion.

In a further embodiment of any of the foregoing embodiments, surfaces of the second end portion are spaced apart from surfaces of the receptacle to define a frame cavity.

In a further embodiment of any of the foregoing embodiments, the tie rod is a plurality of tie rods. The receptacle is a plurality of receptacles circumferentially distributed about an axis of the bearing support housing. Each of the plurality of tie rods is preloaded in compression between the turbine case and the bearing support housing.

A further embodiment of any of the foregoing embodiments includes a retention member moveable relative to the tie rod to compress the tie rod between the turbine case and the receptacle.

A further embodiment of any of the foregoing embodiments includes a lock ring engageable with the retention member to limit relative rotation of the turbine case and the tie rod.

In a further embodiment of any of the foregoing embodiments, the retention member is threadably secured to a first end portion of the tie rod, and is slidably received in a socket defined by the turbine case, with the tie rod translatable relative to the socket in response to rotation of the retention member about the first end portion.

In a further embodiment of any of the foregoing embodiments, the retention member, the lock ring and the tie rod define respective sections of a flow path between the turbine case and a cavity defined by the receptacle.

A further embodiment of any of the foregoing embodiments includes a vane that defines a core flow path of the gas turbine engine, the tie rod extending through the vane.

A gas turbine engine according to an example of the present disclosure includes a fan section that has a fan, a compressor section, and a turbine section that drives at least one of the fan section and the compressor section through a shaft. The turbine section has a turbine frame that extends along an engine axis between a first turbine and a second turbine that define a core flow path. The turbine frame includes a bearing support housing that has a bearing that supports the shaft, a turbine case that at least partially surrounds the bearing support housing, and a plurality of tie rods each preloaded in compression between the turbine case and the bearing support housing.

In a further embodiment of any of the foregoing embodiments the bearing support housing defines a plurality of receptacles defined about an outer periphery of the bearing support housing, an inner periphery of the turbine case defines a plurality of sockets, and each of the plurality of tie rods includes a first end portion and a second end portion. The first end portion received in a respective one of the plurality of sockets, and the second end portion seated against surfaces of a respective one of the plurality of receptacles.

In a further embodiment of any of the foregoing embodiments, each socket of the plurality of sockets is axially offset from a respective receptacle of the plurality of receptacles by a predetermined distance with respect to the engine axis.

A further embodiment of any of the foregoing embodiments includes a plurality of retention members each moveable relative to the first end portion of a respective one of the plurality of tie rods to cause the first end portion to translate along a first axis such that the second end portion is brought into direct abutment with surfaces of a respective one of the plurality of receptacles.

In a further embodiment of any of the foregoing embodiments, each of the plurality of tie rods is translatable along a first axis that is oblique to the engine axis.

In a further embodiment of any of the foregoing embodiments, the plurality of retention members and the plurality of tie rods define a plurality of flow paths between a fluid source and the plurality of receptacles, and the plurality of receptacles is in fluid communication with at least one airflow compartment defined by one of the first and second turbines.

A further embodiment of any of the foregoing embodiments includes a plurality of vanes each having an airfoil section that extend between a first platform and a second platform that bound radially inner and radially outer portions of the core flow path, and each of the plurality of tie rods extending through the airfoil section of a respective one of the plurality of vanes.

A method of assembling a turbine frame according to an example of the present disclosure includes moving a bearing support housing at least partially received in a turbine case, and coupling a tie rod to the turbine case and to the bearing support housing such that the tie rod is preloaded in compression.

A further embodiment of any of the foregoing embodiments includes positioning a first end portion of the tie rod into a socket defined by an inner periphery of the turbine case; and translating the tie rod along an axis defined by the socket such that a second end portion of the tie rod directly abuts against surfaces of a receptacle defined by an outer periphery of the bearing support housing.

In a further embodiment of any of the foregoing embodiments, walls of the receptacle engage a perimeter of the second end portion to limit rotation of the tie rod about the axis.

A further embodiment of any of the foregoing embodiments includes communicating fluid through a fluid passage defined by the tie rod. The fluid passage interconnects a fluid source and a cavity defined between the second end portion and the receptacle.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

DETAILED DESCRIPTION

Figure 1:
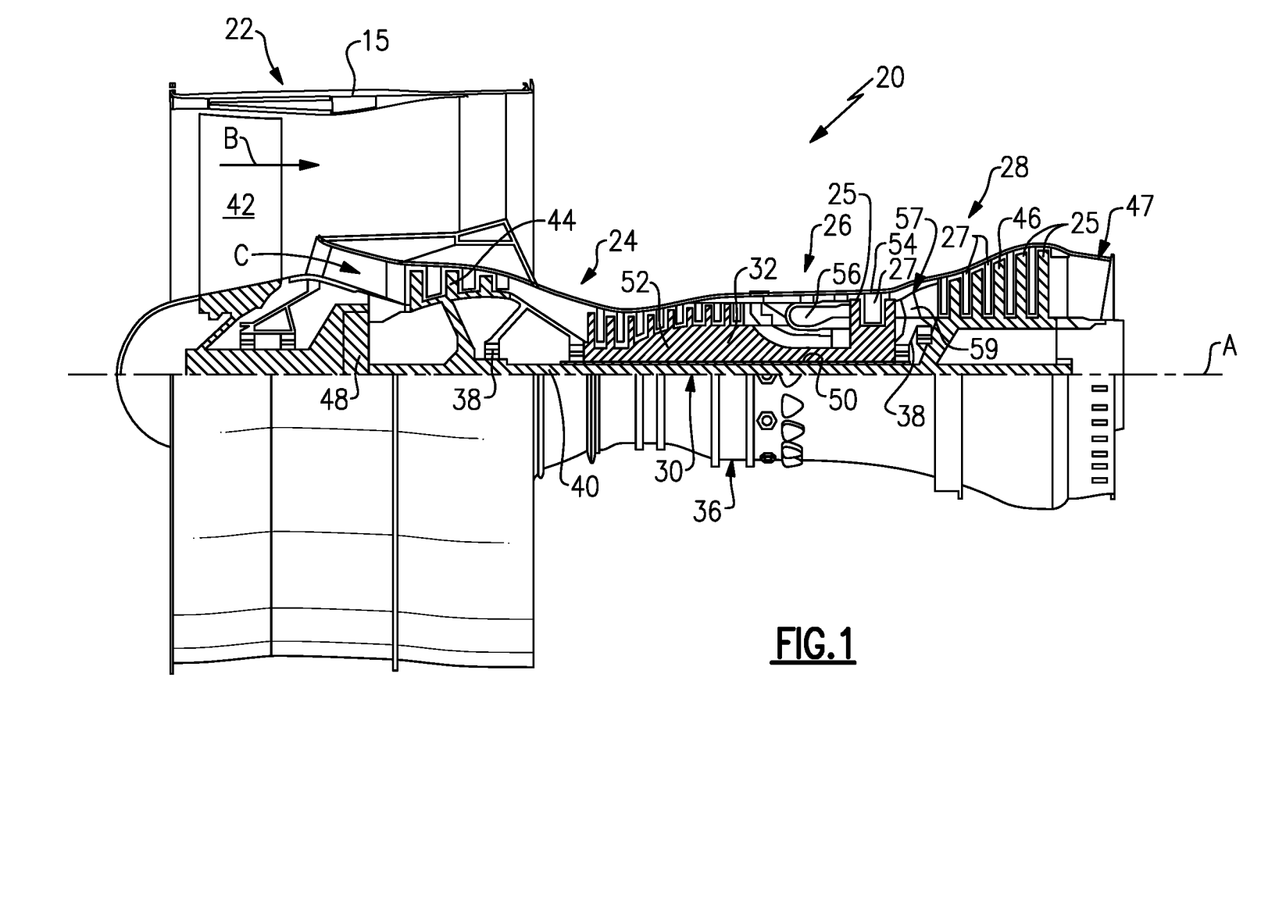
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° R)/(518.7° R)]^{0.5}$. The "Low corrected fan tip speed" as disclosed herein according to one non-limiting embodiment is less than about 1150 ft/second.

The turbine section 28 can include alternating rows of rotor assemblies and vane assemblies that carry airfoils that extend into the core flow path C. For example, the rotor assemblies can carry a plurality of rotating blades 25, while each vane assembly can carry a plurality of vanes 27 that extend into the core flow path C. The vanes 27 of the vane assemblies direct the core airflow to the blades 25. The blades 25 extract energy (in the form of pressure) that is communicated through the gas turbine engine 20 along the core flow path C.

Figure 2:
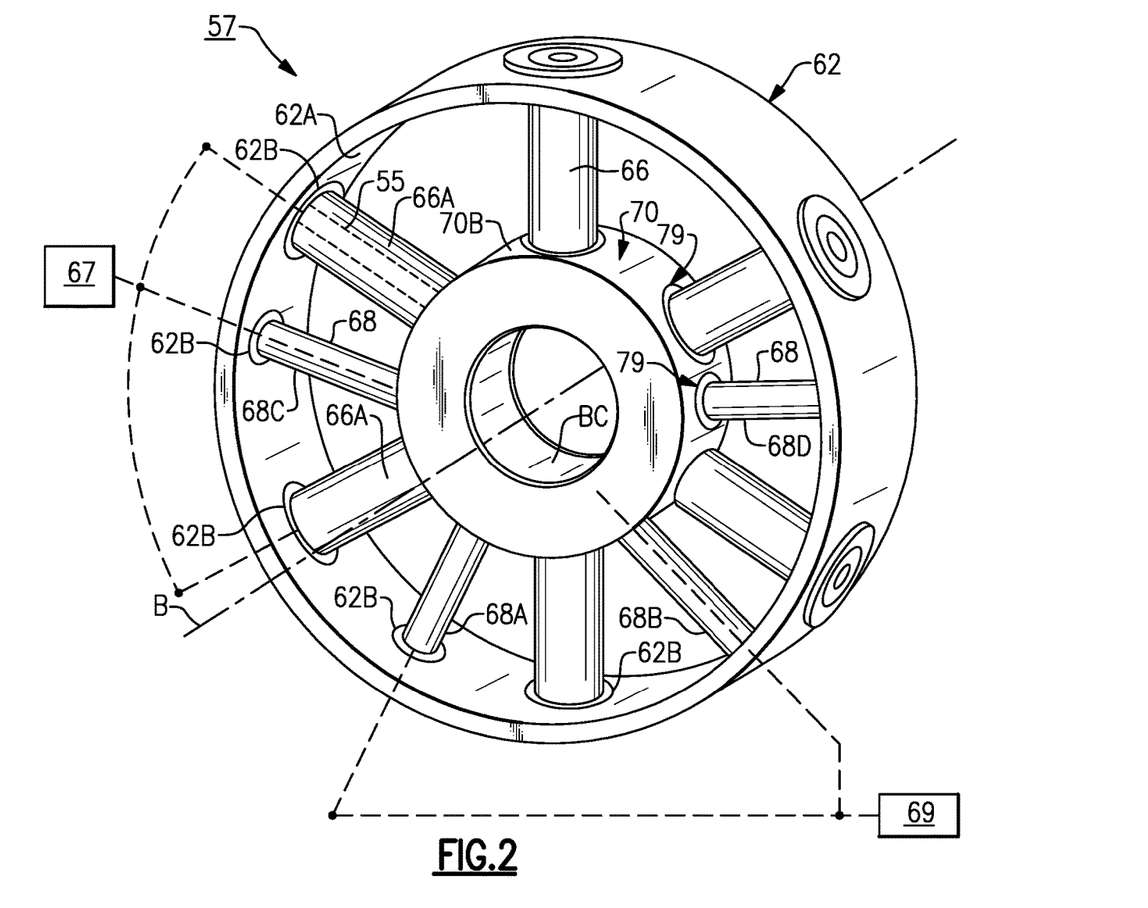
FIG. 2 schematically shows a perspective view of a turbine frame according to a first example.

FIG. 2 is a schematic perspective view of the mid-turbine frame 57. The mid-turbine frame 57 includes an outer frame case 62 and a bearing support member or housing 70 coaxially arranged about a frame axis B. The frame axis B can be aligned with the engine axis A (FIG. 1). The mid-turbine frame 57 is arranged axially between the low pressure turbine 46 (or first turbine) and the high pressure turbine 54 (or second turbine) shown in FIG. 1. One or more spokes or tie rods 66 are distributed about the bearing support housing 70 and extend radially between an inner periphery 62A of the outer frame case 62 and an outer periphery 70B of the bearing support housing 70 to provide structural support. For the purposes of this disclosure, the axial and radial directions are in relation to the frame axis B unless stated otherwise.

The bearing support housing 70 supports the rotor assembly via the bearing system 38 (shown in FIG. 1) located in a bearing compartment BC, and distributes forces from the bearing support housing 70 to the outer frame case 62 via the tie rods 66. The outer frame case 62 is configured to transfer loads from the bearing support housing 70 to other portions of the engine static structure 36 (shown in FIG. 1). In some examples, one or more tie rods 66A define cooling passage(s) 55 (shown schematically in dashed line) to communicate cooling airflow from a fluid or coolant source 67 to the bearing system 38 or to a rotor assembly of the turbine section 28. Coolant sources 67 can include bleed air from an upstream stage of the compressor section 24, bypass air, or a secondary cooling system aboard the aircraft, for example.

One or more service lines 68 are distributed around the circumference of the bearing support housing 70 to provide a path between the outer frame case 62 and the bearing support housing 70. In the illustrated example, the service lines 68 are positioned between adjacent pairs of tie rods 66. The service lines 68 can include, but are not limited to, a conduit, a pressurized lubrication or oil supply line $68_A$, a lubrication or oil scavenge line $68_B$, a coolant supply line $68_C$ coupled to the coolant source 67, and a secondary lubrication or oil drain line 68D, for example.

The lubrication supply and scavenge lines $68_A$, $68_B$ are configured to communicate lubricant between the bearing system 38 and a lubrication source 69, which can include a reservoir and lubrication pump, for example, such that the bearing system 38 is lubricated and cooled during operation of the engine 20. Although six tie rods 66 and four service lines 68 are shown in FIG. 2, more or less tie rods 66 and service lines 68 can be utilized in view of the teachings herein. In the illustrated example, each of the tie rods 66 and service lines 68 extends within a respective airfoil or static vane 59 arranged in the core flow path C (FIG. 1).

The outer frame case 62 defines a plurality of sockets 62B distributed about the frame axis B. The tie rods 66 and service lines 68 together with the bearing support housing 70 define a plurality of locating features 79 distributed about the frame case B. The locating features 79 are configured to releasably secure the tie rods 66 and service lines 68 to the bearing support housing 70.

Figure 3A:
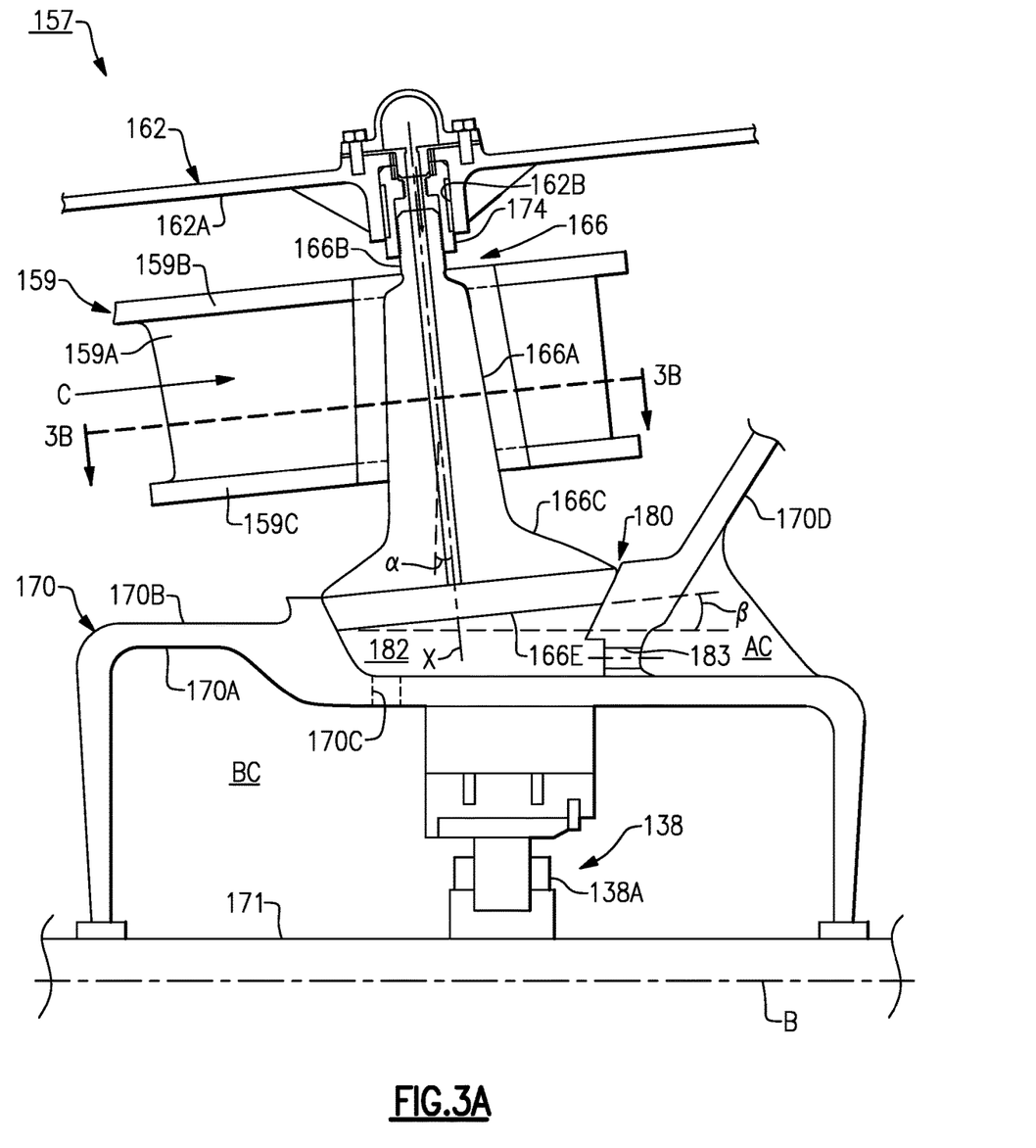
FIG. 3A illustrates a cross-sectional view of a turbine frame according to a second example.

FIG. 3A illustrates a turbine frame 157, according to an example. In this disclosure, like reference numerals designate like elements where appropriate and reference numerals with the addition of one-hundred or multiples thereof designate modified elements that are understood to incorporate the same features and benefits of the corresponding original elements. The turbine frame 157 can be incorporated as a mid-turbine frame in the turbine engine 20 between the low pressure (or first) turbine 46 and the high pressure (or second) turbine 54 of the turbine section 28, for example. Other portions of the engine 20 and systems may benefit from the teachings herein, such as the compressor section 24, turbine exhaust case 47 (FIG. 1) and adjacent locations of one or more of the bearing systems 38, land based turbine engines, and fixed wing and rotary aircraft.

The turbine frame 157 extends along a frame axis B, which may be collinear or parallel with the engine axis A of FIG. 1. The turbine frame 157 includes an outer (or turbine) case 162. The outer case 162 can be coupled to the engine static structure 36 (FIG. 1), for example. The outer case 162 extends about the frame axis B to at least partially surround a bearing support member or housing 170. An inner periphery 170A of the bearing support housing 170 defines a bearing compartment BC that includes a bearing system 138. Bearing system 138 includes at least one bearing 138A that supports a shaft 171. The shaft 171 can be one of the inner and outer shafts 40, 52 of FIG. 1, for example.

Figure 3B:
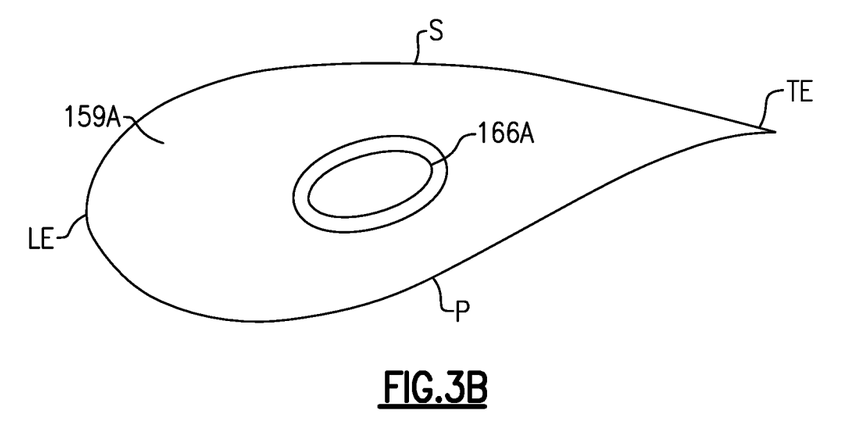
FIG. 3B illustrates a cross-sectional view of an airfoil section taken along line 3B-3B of FIG. 3A.

The turbine frame 157 includes a plurality of vanes 159 (one shown) each defining a portion of the core flow path C. Each vane 159 includes an airfoil section 159A extending between a first (or radially outer) platform 159B and a second (or radially inner) platform 159C. The platforms 159B, 159C bound radially inner and radially outer portions of core flow path C. Each airfoils section 159A extends in a chordwise direction between a leading edge LE and a trailing edge TE, and extends in a thickness direction between a pressure side P and a suction side S, as illustrated by FIG. 3B.

The turbine frame 157 includes a plurality of spokes or tie rods 166 circumferentially distributed between the outer case 162 and the bearing support housing 170. Each tie rod 166 includes an elongated body 166A that extends between a first (or radially outer) end portion 166B and a second (or radially inner) end portion 166C. The first end portion 166B is coupled to the outer case 162. The second end portion 166C is coupled to the bearing support housing 170 to provide a load path directly between the bearing support housing 170 and the outer case 162, which can reduce parts count and overall weight of the engine. In the illustrated example of FIG. 3A, the turbine frame 157 is free of a separate inner frame case between the tie rods 166 and the bearing support housing 170, which can reduce cost and overall weight and compactness of the engine. Said differently, the bearing support housing 170 provides the function of an inner frame case. In some examples, at least some of the tie rods 166 are one or more of the service lines 68 of FIG. 2. In the illustrated example of FIG. 3A, each tie rod 166 extends through at least the airfoil section 159A and/or platforms 159B, 159C of a respective one of the vanes 159.

Figure 4:
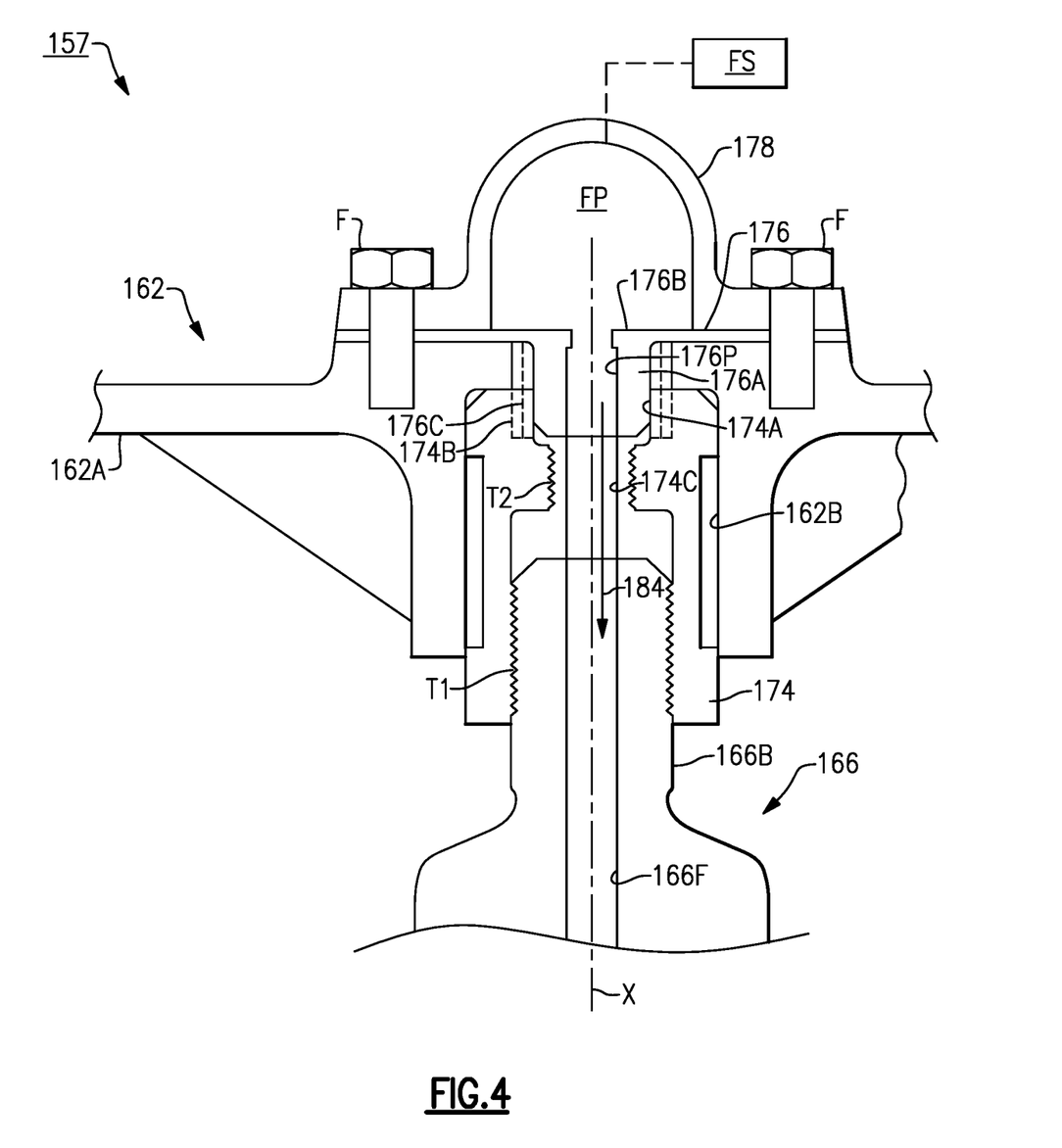
FIG. 4 illustrates a portion of the turbine frame of FIG. 3A, including a frame case.

Referring to FIG. 4, with continued reference to FIG. 3A, an inner periphery 162A of the outer case 162 defines a plurality of elongated sockets 162B (one shown) circumferentially distributed about the frame axis B. The first end portion 166B of each tie rod 166 is at least partially received in a respective one of the sockets 162B by translating or otherwise moving the tie rod 166 along a first axis X defined by the tie rod 166 or respective socket 162B. The first axis X can be oblique to the frame axis B and/or engine axis A of FIG. 1. In other examples, the first axis X is substantially perpendicular to the frame axis B and/or engine axis A.

The turbine frame 157 includes a plurality of retention members 174 (one shown) for securing the tie rods 166 to the outer case 162. Each retention member 174 is slideably received in a respective socket 162B. The retention member 174 can be dimensioned to have a relatively close tolerance slip fit relative to the socket 162B, and can be dimensioned to have a relatively long cylindrical contact with walls of the socket 162B to increase stability of the tie rods 166.

The retention member 174 is moveable relative to the first end portion 166B of the tie rod 166 to cause the first end portion 166B to translate along the first axis X. In the illustrated example of FIG. 4, the retention member 174 is an elongated nut that is threadably secured to the first end portion 166B of the tie rod 166. The retention member 174 includes threads T1 that engage threads defined by a periphery of the first end portion 166B of the tie rod 166, with the retention member 174 rotatable about the first axis X. The tie rod 166 is translatable relative to the socket 162B and along the first axis X in response to rotation of the retention member 174 about the first end portion 166B.

Figure 4A:
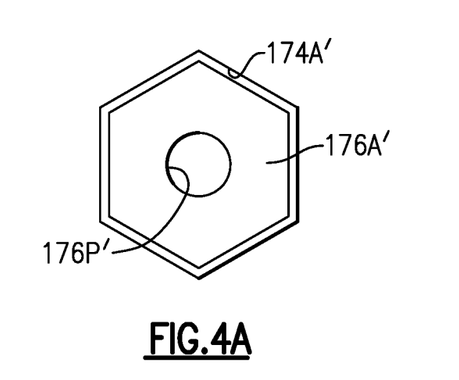
FIG. 4A illustrates a hexagon interface.
Figure 4B:
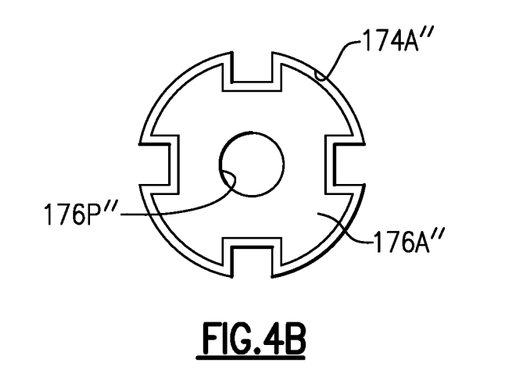
FIG. 4B illustrates a spline interface.

The turbine frame 157 can also include a plurality of lock rings 176 (one shown). Each lock ring 176 is engageable with a respective retention member 174 to limit rotation of the retention member 174 relative to the outer case 162. For example, the lock ring 176 can include a protrusion 176A extending from a plate 176B. The protrusion 176A is received within a bore 174A defined by the retention member 174. The protrusion 176A and the bore 174A can have a complementary, non-circular geometry such that the protrusion 176A engages walls of the bore 174A to limit relative rotation. In some examples, protrusion 176A'/176" and bore 174A'/174" define a hexagon or spline interface, as illustrated by FIGS. 4A and 4B. In other examples, the lock ring 176 includes a key 176C that engages a keyway 174B (each shown in dashed lines) defined by the retention member 174 to limit relative rotation.

The turbine frame 157 can also include one or more plumbing fittings 178 (one shown). Each plumbing fitting 178 defines a fluid plenum FP in communication with a fluid source FS. The fluid source FS can be any of the fluid sources disclosed herein, such as coolant source 67 or lubrication source 69 of FIG. 2. The lock ring 176 and the plumbing fitting 178 can be mechanically attached to the outer case 162 with one or more fasteners F.

Figure 5:
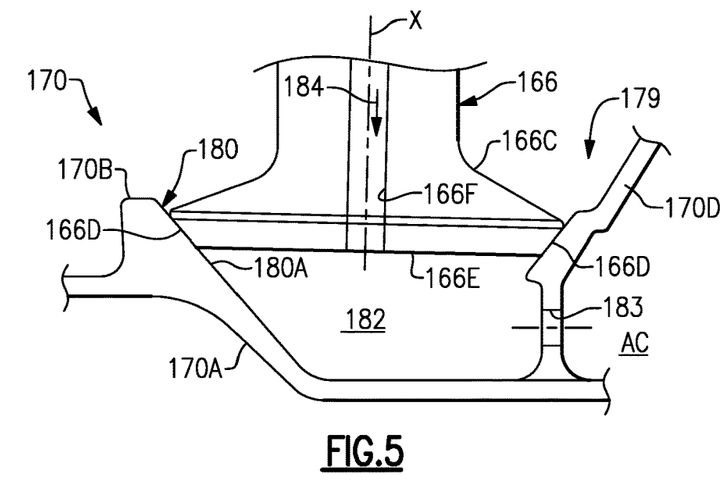
FIG. 5 illustrates another portion of the turbine frame of FIG. 3B, including a bearing support housing.

Referring to FIG. 5 with continued reference to FIGS. 3A and 4, the tie rod 166 and bearing support housing 170 cooperate to define a locating feature 179 for releasably securing the tie rod 166. The locating feature 179 includes the second end portion 166C and a plurality of receptacles 180 (one shown) defined by the bearing support housing 170. The receptacles 180 are spaced about an outer periphery 170B of the bearing support housing 170. Each of the receptacles 180 can be recessed inwardly relative to the outer periphery 170B of the bearing support housing 170, and at least partially receive the second end portion 166C of a respective one of the tie rods 166.

The second end portion 166C is seated against surfaces of land 180A of the receptacle 180 to fixedly and releasably secure the bearing support housing 170 to the outer case 162. The arrangement of the second end portion 166C and the receptacles 180 can reduce a complexity of assembling the turbine frame 157 and eliminate the need for fasteners to secure the tie rods 166 to the bearing support housing 170, although one or more fasteners can be utilized to further secure the tie rods 166.

The second end portion 166C of the tie rod 166 includes one or more engagement surfaces 166D that mate with the receptacle 180. The engagement surfaces 166D directly abut against or otherwise directly contact surfaces of a land 180A of the respective receptacle 180 to secure the tie rod 166. The land 180A and engagement surfaces 166D limit rotation of the tie rod 166 about the first axis X and with respect to the bearing support housing 170.

Figure 6:
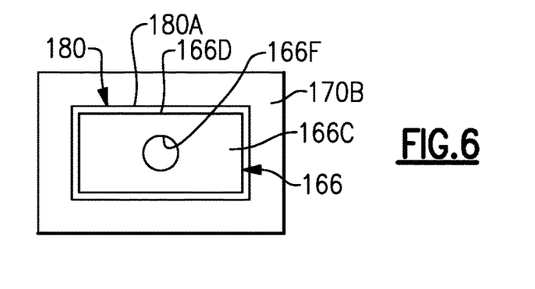
FIG. 6 illustrates a locating feature according to a first example.

Walls along a perimeter of the land 180A can have a complementary geometry with walls of a perimeter of the second end portion 166C defined by the engagement surfaces 166D, as illustrated schematically by FIG. 6. The perimeters of the land 180A and the engagement surfaces 166D can have a substantially non-circular geometry, such as a polygonal geometry. In the illustrated example of FIG. 6, the perimeters of the land 180A and the engagement surfaces 166D have a substantially rectangular geometry to limit or otherwise resist relative rotation. The engagement surfaces 166D and the land 180A can included sloped surfaces or bevels for guiding or substantially aligning the second end portion 166C of the tie rod 166 and the receptacle 180 during assembly, with the second end portion 166C wedged in the lands 180A in an assembled position.

The first axis X can be transverse to the frame axis B and/or engine axis A (FIG. 1) to define a first angle α (FIG. 3A) such that the sockets 162B are axially offset from the receptacles 180 by a predetermined distance. In some examples, the first angle α is about 2 to 10 degrees, or about 5 degrees, such that the sockets 162B are axially forward of the receptacles 180 with respect to the frame axis B. In other examples, the first axis X is substantially perpendicular to the frame axis B such that the sockets 162B are substantially axially aligned with the receptacles 180.

One or more of the receptacles 180 can communicate fluid between the fluid source FS and at least one airflow compartment AC defined by the first and/or second turbines 46, 54 (FIG. 1), for example. In the illustrated example of FIG. 5, radially inward surfaces 166E of the second end portion 166C are spaced apart from surfaces of the receptacle 180 to define a frame cavity 182. The frame cavity 182 can be configured to communicate fluid to the airflow compartment AC via bore 183 defined by an aft flange 170D. Aft flange 170D can be simplified and lightened since it is unnecessary for the flange 170D to support bearing loads from the bearing system 138. The radially inward surfaces 166E can be sloped relative to an axis that is parallel to the frame axis B to define a second angle β (FIG. 3A). The second angle β can be about 2 to 10 degrees, or about 5 degrees, for example, and assists in allowing the second end portions 166C of the tie rods 166 to be guided into the receptacles 180 and to correctly orient the tie rods 166 during assembly.

The retention members 174 and the tie rods 166 can define a plurality flow paths or fluid passages between the fluid source FS and the frame cavities 182. In the illustrated example of FIG. 4, a set of the retention members 174, lock rings 176, and tie rods 166 define respective sections of a flow path or fluid passage 184 between the fluid source FS, outer case 162 and the frame cavity 182. The lock ring 176 defines a first fluid passage 176P fluidly coupled to the fluid plenum FP. The tie rod 166 defines a second fluid passage 166F coupled to the frame cavity 182. The retention member 174 defines a third fluid passage 174C interconnecting the first and second fluid passages 176P and 166F. In addition, or alternatively to bore 183, the bearing support housing 170 can define one or more passages 170C (one shown in dashed lines) to communicate fluid between the respective frame cavity 182 and the bearing compartment BC.

Figure 7:
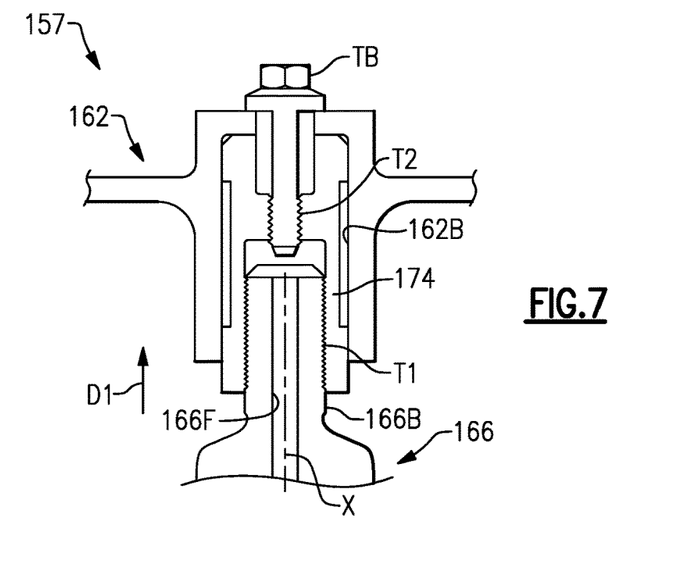
FIG. 7 illustrates a portion of the turbine frame of FIG. 3A in a partially assembled position.
Figure 8:
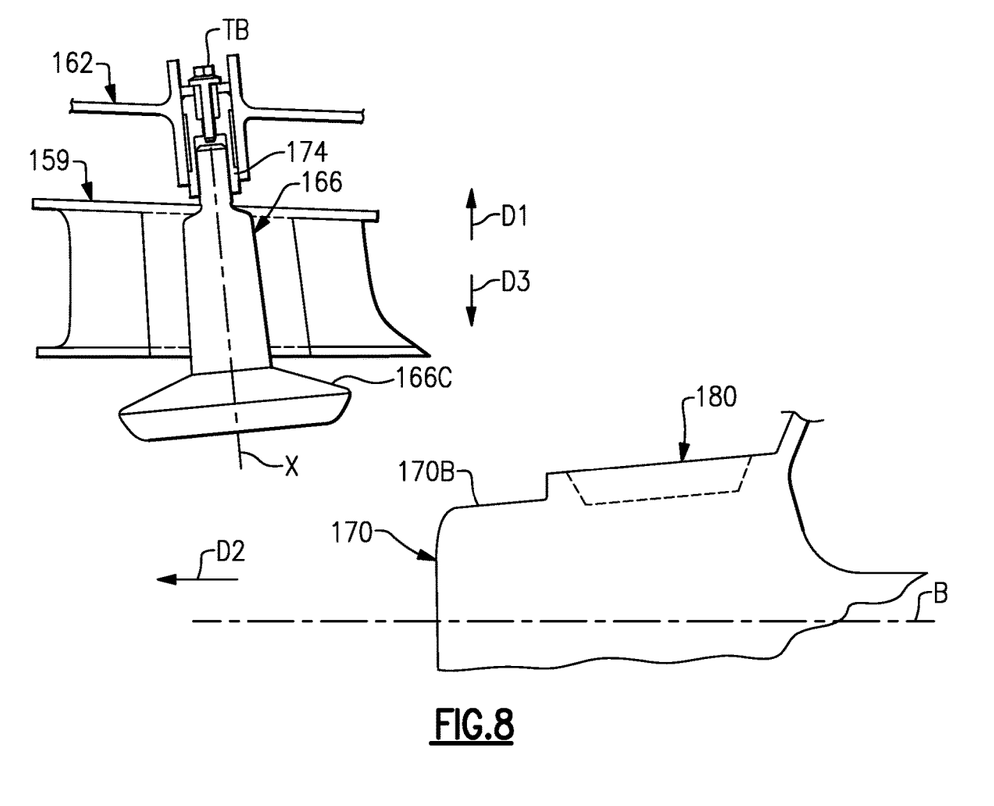
FIG. 8 illustrates portions of the turbine frame of FIG. 3A in a partially assembled position.

Referring to FIGS. 7 and 8, the turbine frame 157 can be assembled as follows. Each retention member 174 is at least partially fastened or otherwise mechanically attached to the first end portion 166B of the tie rod 166 via threads T1. Each vane 159 is positioned at least partially inside the outer case 162 and can be supported onto the outer case 162 with tooling (not shown). Each set of tie rods 166 and retention members 174 is moved generally in a direction D1, such as from a radially inward direction to a radially outward direction, to insert at least a portion of the tie rod 166 through a respective one of the vanes 159 and in a respective one of the sockets 162B. The retention member 174 can be secured to the outer case 162 by utilizing a tool bolt TB which can be threadably fastened to the retention member 174 via threads T2, for example.

The bearing support housing 170 is moved generally in a direction D2 along the frame axis B such that the bearing support housing 170 is at least partially received in the outer case 162. It should be appreciated that the installer can have a line of sight from an axially forward position relative to the frame axis B during movement of the bearing support housing 170, which can also improve the ability to visually inspect the turbine frame 157 during assembly. The tool bolt TB can be removed to allow the tie rod 166 and retention member 174 to move a distance inwardly toward the bearing support housing 170.

Thereafter, the retention member 174 is engaged with tooling, such as a wrench (not shown), to rotate the retention member 174 about the first axis X. The retention member 174 is engaged to cause the tie rod 166 to translate or otherwise move along the first axis X in a direction D3 that is generally opposite to direction D1 until the tie rod 166 is located in a desired position. The tie rod 166 can be moved in the direction D3 such that the engagement surfaces 166D of the second end portion 166C are brought into direct abutment or contact with surfaces of the land 180A of the receptacle 180, as illustrated by FIGS. 3A and 5. Walls of the receptacle 180 engage the second end portion 166C to limit rotation of the tie rod 166 relative to the bearing support housing 170. Releasably securing the tie rods 166 to the bearing support housing 170 by preloading the tie rods 166 in compression can reduce assembly complexity and the need for fasteners.

The retention member 174 can be further rotated by the tooling to cause the tie rod 166 to be preloaded in compression between the outer case 162 and the bearing support housing 170. The retention member 174 can be torqued, and the tie rods 166 can be preloaded by a predetermined amount of force that exceeds an expected amount of loading experienced by the tie rods 166 during engine operation, including various maneuvering and compression caused by thermal growth of one or more of the components of the turbine frame 157, such that the tie rods 166 remain in compression during engine operation. Thermal expansion of the bearing support housing 170 during engine operation causes the tie rods 166 to remain in compression. The predetermined amount of preloading can be defined with respect to the retention members 174 at a location in which the retention member 174 contacts an outer end of the socket 162B, for example, thereby simplifying and improving consistency in the assembly process. Once in the installed position, fluid can be communicated through the fluid passage 184 between the fluid source FS and the receptacle 180.

Figure 9:
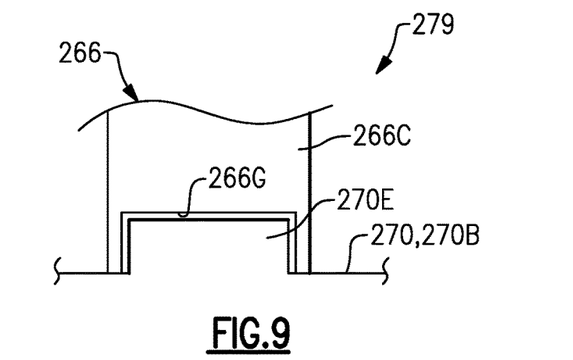
FIG. 9 illustrates a locating feature according to a second example.

FIG. 9 illustrates a locating feature 279 according to a second example. In the illustrated example, a second end portion 266C of tie rod 266 defines a receptacle 266G. The receptacle 266G is dimensioned to receive a protrusion 270E extending from outer periphery 270B of bearing support housing 270 to seat the tie rod 266 against the bearing support housing 270. The tie rod 266 can be preloaded in compression utilizing any of the techniques disclosed herein.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A turbine frame for a gas turbine engine comprising:
   a turbine case defining a socket defining a first axis;
   a bearing support housing defining a receptacle, and wherein the receptacle extends inwardly from an outer periphery of the bearing support housing to establish a land; and
   a tie rod preloaded in compression between the turbine case and the bearing support housing;
   wherein the tie rod includes an elongated body extending between a first end portion and a second end portion; and
   wherein the tie rod is translatable along the first axis such that the second end portion is seated in the receptacle and such that walls of the land engage a perimeter of the second end portion to establish an interface that limits rotation of the tie rod about the first axis.

2. The turbine frame as recited in claim 1, wherein the walls of the receptacle have a complementary geometry with the perimeter of the second end portion.

3. The turbine frame as recited in claim 2, wherein surfaces of the second end portion are spaced apart from surfaces of the receptacle to define a frame cavity.

4. The turbine frame as recited in claim 1, wherein the tie rod is a plurality of tie rods, the receptacle is a plurality of receptacles circumferentially distributed about an axis of the bearing support housing, and each of the plurality of tie rods is preloaded in compression between the turbine case and the bearing support housing.

5. The turbine frame as recited in claim 1, comprising a retention member moveable relative to the tie rod to compress the tie rod between the turbine case and the receptacle.

6. The turbine frame as recited in claim 5, comprising a lock ring engageable with the retention member to limit relative rotation of the turbine case and the tie rod.

7. The turbine frame as recited in claim 6, wherein the retention member is threadably secured to the first end portion of the tie rod, and is slidably received in the socket, with the tie rod translatable relative to the socket in response to rotation of the retention member about the first end portion.

8. The turbine frame as recited in claim 6, wherein the retention member, the lock ring and the tie rod define respective sections of a flow path between the turbine case and a cavity defined by the receptacle.

9. The turbine frame as recited in claim 5, wherein:
the perimeter of the second end portion and a perimeter of the land have a non-circular geometry along the interface; and
the first end portion of the tie rod is slidably received in the socket, with the tie rod translatable relative to the socket in response to rotation of the retention member about the first end portion such that the socket is axially offset from the receptacle by a predetermined distance with respect to a longitudinal axis of the bearing support housing.

10. The turbine frame as recited in claim 1, comprising a vane defining a core flow path of the gas turbine engine, the tie rod extending through the vane.

11. The turbine frame as recited in claim 1, wherein the perimeter of the second end portion and a perimeter of the land have a rectangular geometry.

12. The turbine frame as recited in claim 1, wherein the walls of the land slope inwardly toward a floor bounding the receptacle.

13. A gas turbine engine comprising:
a compressor section; and
a turbine section driving the compressor section through a shaft, the turbine section including a turbine frame extending along an engine axis between a first turbine and a second turbine that define a core flow path, the turbine frame comprising:
a bearing support housing including a bearing that supports the shaft;
a turbine case that at least partially surrounds the bearing support housing; and
a plurality of tie rods each preloaded in compression between the turbine case and the bearing support housing;
wherein the bearing support hosing defines a plurality of receptacles defined about an outer periphery of the bearing support housing;
wherein an inner periphery of the turbine case defines a plurality of sockets;
wherein each of the plurality of tie rods includes a first end portion and a second end portion, the first end portion received in a respective one of the plurality of sockets, and the second end portion seated against surfaces of a respective one of the plurality of receptacles; and
wherein each socket of the plurality of sockets is axially offset from a respective receptacle of the plurality of receptacles by a predetermined distance with respect to the engine axis.

14. The gas turbine engine as recited in claim 13, comprising a plurality of retention members each moveable relative to the first end portion of a respective one of the plurality of tie rods to cause the first end portion to translate along a first axis such that the second end portion is brought into direct abutment with surfaces of a respective one of the plurality of receptacles.

15. The gas turbine engine as recited in claim 14, wherein each of the plurality of tie rods is translatable along a first axis that is oblique to the engine axis.

16. The gas turbine engine as recited in claim 14, wherein the plurality of retention members and the plurality of tie rods define a plurality of flow paths between a fluid source and the plurality of receptacles, and the plurality of receptacles being in fluid communication with at least one airflow compartment defined by one of the first and second turbines.

17. The gas turbine engine as recited in claim 13, comprising a plurality of vanes each having an airfoil section extending between a first platform and a second platform that bound radially inner and radially outer portions of the core flow path, and each of the plurality of tie rods extending through the airfoil section of a respective one of the plurality of vanes.

18. A method of assembling a turbine frame comprising:
moving a bearing support housing at least partially received in a turbine case;
coupling a tie rod to the turbine case and to the bearing support housing such that the tie rod is preloaded in compression;
positioning a first end portion of the tie rod into a socket defined by an inner periphery of the turbine case; and
translating the tie rod along an axis defined by the socket such that a second end portion of the tie rod directly abuts against surfaces of a receptacle defined by an outer periphery of the bearing support housing.

19. The method as recited in claim 18, wherein walls of the receptacle engage a perimeter of the second end portion to limit rotation of the tie rod about the axis.

20. The method as recited in claim 18, comprising communicating fluid through a fluid passage defined by the tie rod, the fluid passage interconnecting a fluid source and a cavity defined between the second end portion and the receptacle.

* * * * *